(12) United States Patent
Pu

(10) Patent No.: US 12,111,728 B2
(45) Date of Patent: Oct. 8, 2024

(54) DATA RECOVERY METHOD, SYSTEM, AND APPARATUS IN STORAGE SYSTEM

(71) Applicant: HUAWEI TECHNOLOGIES CO., LTD., Guangdong (CN)

(72) Inventor: Guiyou Pu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/883,708

(22) Filed: Aug. 9, 2022

(65) Prior Publication Data

US 2023/0076381 A1 Mar. 9, 2023

Related U.S. Application Data

(63) Continuation of application No. 17/233,893, filed on Apr. 19, 2021, now abandoned, which is a continuation of application No. PCT/CN2019/103085, filed on Aug. 28, 2019.

(30) Foreign Application Priority Data

Oct. 25, 2018 (CN) .......................... 201811248415.5
Dec. 20, 2018 (CN) .......................... 201811560345.7

(51) Int. Cl.
*G06F 11/00* (2006.01)
*G06F 3/06* (2006.01)
*G06F 11/10* (2006.01)

(52) U.S. Cl.
CPC .......... *G06F 11/108* (2013.01); *G06F 3/0619* (2013.01); *G06F 3/0688* (2013.01); *G06F 3/0644* (2013.01)

(58) Field of Classification Search
CPC .... G06F 3/0604; G06F 3/0638; G06F 3/0644; G06F 3/0679; G06F 3/0688
See application file for complete search history.

(56) References Cited

U.S. PATENT DOCUMENTS

| | | | |
|---|---|---|---|
| 6,282,045 B1 | 8/2001 | Glover | |
| 9,542,118 B1 * | 1/2017 | Lercari | ................ G06F 3/0616 |
| 10,817,218 B2 * | 10/2020 | Jo | ......................... G06F 3/0656 |
| 10,929,226 B1 | 2/2021 | Miller et al. | |

(Continued)

FOREIGN PATENT DOCUMENTS

| | | | |
|---|---|---|---|
| CN | 101105970 A | 1/2008 | |
| CN | 102708019 A | 10/2012 | |

(Continued)

OTHER PUBLICATIONS

Symphonic Cooperative Flash Management, 2015, Radian Memory Systems (Year: 2015).*

(Continued)

*Primary Examiner* — Marc Duncan
(74) *Attorney, Agent, or Firm* — HUAWEI TECHNOLOGIES CO., LTD.

(57) ABSTRACT

Embodiments of the present disclosure provide a data recovery method in a storage system. A solid state disk is divided into a plurality of fault domains, and each fault domain is used to provide a physical address for a specific range of logical addresses of an SSD, so that when a fault domain of the solid state disk is faulty, it is unnecessary to reconstruct data in the entire SSD.

12 Claims, 8 Drawing Sheets

(56) References Cited

U.S. PATENT DOCUMENTS

| | | | |
|---|---|---|---|
| 10,996,863 B1* | 5/2021 | Kuzmin | G06F 12/0246 |
| 2008/0126912 A1 | 5/2008 | Zohar et al. | |
| 2011/0131472 A1 | 6/2011 | Antonakopoulos et al. | |
| 2015/0067245 A1 | 3/2015 | Kruger | |
| 2015/0355971 A1 | 12/2015 | Becker-Szendy et al. | |
| 2016/0062652 A1 | 3/2016 | Hia et al. | |
| 2016/0277039 A1 | 9/2016 | Jin et al. | |
| 2017/0052847 A1 | 2/2017 | Ben Dayan et al. | |
| 2018/0011762 A1 | 1/2018 | Klein | |
| 2018/0018233 A1 | 1/2018 | Kim et al. | |
| 2019/0377638 A1 | 12/2019 | Ben Dayan et al. | |
| 2021/0240584 A1* | 8/2021 | Pu | G06F 11/108 |
| 2021/0248713 A1 | 8/2021 | Ben Dayan et al. | |

FOREIGN PATENT DOCUMENTS

| | | |
|---|---|---|
| CN | 102915212 A | 2/2013 |
| CN | 103488583 A | 1/2014 |
| CN | 103559138 A | 2/2014 |
| CN | 103713969 A | 4/2014 |
| CN | 104583930 A | 4/2015 |
| CN | 105260267 A | 1/2016 |
| CN | 106844098 A | 6/2017 |
| CN | 107085546 A | 8/2017 |
| CN | 107168884 A | 9/2017 |
| CN | 107193758 A | 9/2017 |
| CN | 107203328 A | 9/2017 |
| CN | 107273061 A | 10/2017 |
| CN | 107315546 A | 11/2017 |
| CN | 107885457 A | 4/2018 |
| CN | 108540315 A | 9/2018 |

OTHER PUBLICATIONS

RMS-325, 2016, Radian Memory Systems (Year: 2016).*
Robinson, Cliff, Radian Memory Systems RMS-350 U.2 Open Channel 2.0 SSD, 2018, STH (Year: 2018).*
Gonzalez, Javier et al., Multi-Tenant I/O Isolation with Open-Channel SSDs, 2017, ResearchGate (Year: 2017).*
Bjorling, Matias et al., LightNVM: The Linux Open-Channel SSD Subsystem, 2017, USENIX Association (Year: 2017).*
Song Zhenlong,"Research on Large Scale Parallel Storage Systems for Super Computing",National University of Defense Technology,Dec. 2014,with an English abstract,total 151 pages.
Product "RMS-350",Radian Memory Systems,Open-Channel Specification Revision 2.0, Jan. 29, 2018,total 5 pages.
Zoned Namespaces(ZNS),Coorperative Flash Management,Radian Memory Systems,2019,total 7 pages.

* cited by examiner

| Fault domain identifier | 0 | 1 | 2 | 3 | ... | 31 |
|---|---|---|---|---|---|---|
| Logical address range | 0 to (1 TB – 1) | 1 TB to (2 TB – 1) | 2 TB to (3 TB – 1) | 3 TB to (4 TB – 1) | ... | 31 TB to (32 TB – 1) |

DATA RECOVERY METHOD, SYSTEM, AND APPARATUS IN STORAGE SYSTEM

CROSS-REFERENCE TO RELATED APPLICATION

This application is a continuation of U.S. patent application Ser. No. 17/233,893, filed on Apr. 19, 2021, which is a continuation of International Application No. PCT/CN2019/103085, filed on Aug. 28, 2019, which claims priority to Chinese Patent Application No. 201811560345.7, filed on Dec. 20, 2018 and Chinese Patent Application No. 201811248415.5, filed on Oct. 25, 2018. All of the aforementioned patent applications are hereby incorporated by reference in their entireties.

TECHNICAL FIELD

The present disclosure relates to the field of information technologies, and in particular, to a data recovery method, system, and apparatus in a storage system.

BACKGROUND

A redundant array of independent disks (RAID) technology is a technology widely used in storage systems to ensure data reliability. When a hard disk in the storage system is damaged, data on the damaged hard disk can be re-calculated by using data and parity data on an undamaged hard disk. Such a process is referred to as reconstruction of a RAID.

In a RAID-based storage system including a solid state disk (SSD), if a reconstruction speed is 1 terabyte (TB) every five hours, five hours are consumed if an SSD with a capacity of 1 TB is partially faulty, and if the capacity of the SSD is 100 TB, reconstruction time is 500 hours.

SUMMARY

According to a first aspect, a data recovery method in a storage system is provided. The storage system includes a controller, a first solid state disk SSD, and a second SSD. The first SSD and the second SSD each include a plurality of fault domains, the storage system includes a chunk group that is formed based on an erasure code algorithm, and the chunk group includes a first chunk and a second chunk. An address of the first chunk is mapped to a physical address provided by a first fault domain of the first SSD, and an address of the second chunk is mapped to a physical address provided by a second fault domain of the second SSD. The method includes: receiving, by controller, fault information of the first SSD; and in response to the fault information, recovering, by the controller based on the erasure code algorithm, data stored at a logical address of the first chunk in the chunk group. The first SSD and the second SSD each include a plurality of fault domains, but a quantity of fault domains in the first SSD and a quantity of fault domains in the second SSD may be different. Therefore, compared with the prior art, in the storage system in this embodiment of the present disclosure, it is unnecessary to reconstruct data at all logical addresses of a faulty SSD, and only data at some logical addresses of the SSD needs to be reconstructed, where the some logical addresses are logical addresses mapped to physical addresses in faulty fault domains. In this way, a data reconstruction speed is increased.

In specific implementation, that the address of the first chunk is mapped to the physical address provided by the first fault domain of the first SSD includes: the address of the first chunk is a first logical address of the first SSD, and the first logical address is mapped to the physical address provided by the first fault domain of the first SSD; that the address of the second chunk is mapped to the physical address provided by the second fault domain of the second SSD includes: the address of the second chunk is a second logical address of the second SSD, and the second logical address is mapped to the physical address provided by the second fault domain of the second SSD. In another implementation, in an SSD scenario supporting an open channel, the address of the first chunk is the physical address provided by the first fault domain of the first SSD, and that the address of the first chunk is mapped to the physical address provided by the first fault domain of the first SSD is that the address of the first chunk is directly mapped to the physical address provided by the first fault domain of the first SSD; and the address of the second chunk is the physical address provided by the second fault domain of the second SSD, and the address of the second chunk is directly mapped to the physical address provided by the second fault domain of the second SSD. In another implementation, in an SSD scenario supporting an open channel, this embodiment of the present disclosure also supports indirect mapping of a chunk address to a physical address provided by a fault domain.

With reference to the first aspect, in some implementations of the first aspect, the storage system stores a correspondence between the address of the first chunk and the first fault domain and a correspondence between the address of the second chunk and the second fault domain. The address of the first chunk is the first logical address of the first SSD, and the address of the second chunk is the second logical address of the second SSD. Further, the storage system stores a correspondence between a chunk included in the chunk group and a fault domain, for example, the first chunk belongs to the first fault domain, and the second chunk belongs to the second fault domain. Further, the storage system also stores a fault domain index table. For example, the fault domain index table includes a correspondence between a fault domain and a chunk group. Because a same chunk group includes chunks from fault domains of different SSDs, in the fault domain index table, different fault domains may correspond to a same chunk group. When a fault domain of an SSD is faulty, the controller can quickly find, based on the fault domain index table, a chunk group affected by the fault domain, to quickly reconstruct data in a chunk that is in the chunk group and that is affected by the fault domain.

Optionally, one fault domain in the first SSD and the second SSD is a plurality of die packages connected on one channel, or is one or more die packages, or is one or more dies, or is one or more flash memory planes.

With reference to the first aspect, in some implementations of the first aspect, the responding to the fault information includes: querying, by the controller, a correspondence between the first fault domain and the chunk group to determine the chunk group.

With reference to the first aspect, in some implementations of the first aspect, the storage system stores a correspondence between the address of the first chunk and the first fault domain and a correspondence between the address of the second chunk and the second fault domain.

According to a second aspect, a method for managing a solid state disk SSD is provided, where the SSD includes a first fault domain and a second fault domain, and the method includes: assigning a first range of logical addresses of the SSD to the first fault domain, and assigning a second range of logical addresses of the SSD to the second fault domain.

With reference to the second aspect, in some implementations of the second aspect, the method further includes: separately recording a correspondence between the first fault domain and the first range of logical addresses and a correspondence between the second fault domain and the second range of logical addresses.

With reference to the second aspect, in some implementations of the second aspect, both the first range of logical addresses and the second range of logical addresses are contiguous logical addresses, or the first range of logical addresses and the second range of logical addresses are non-contiguous logical addresses.

With reference to the second aspect, in some implementations of the second aspect, the method further includes: sending, by the SSD, a correspondence between the first fault domain and the first range of logical addresses and a correspondence between the second fault domain and the second range of logical addresses to a controller in a storage system, where the storage system includes the SSD.

According to a third aspect, an embodiment of the present disclosure provides a controller used in a storage system, and the controller includes units for implementing various solutions in the first aspect.

According to a fourth aspect, an embodiment of the present disclosure provides an apparatus for managing an SSD, and the apparatus includes units for implementing various solutions in the second aspect.

According to a fifth aspect, an embodiment of the present disclosure provides a computer readable storage medium, the computer readable storage medium stores a computer instruction, and the computer instruction is used to perform various methods in the first aspect.

According to a sixth aspect, an embodiment of the present disclosure provides a computer program product including a computer instruction, and the computer instruction is used to perform various methods in the first aspect.

According to a seventh aspect, an embodiment of the present disclosure provides a computer readable storage medium, the computer readable storage medium stores a computer instruction, and the computer instruction is used to perform various methods in the second aspect.

According to an eighth aspect, an embodiment of the present disclosure provides a computer program product including a computer instruction, and the computer instruction is used to perform various methods in the second aspect.

According to a ninth aspect, an embodiment of the present disclosure provides a solid state disk SSD, the SSD includes an SSD controller, a first fault domain, and a second fault domain, and the SSD controller is configured to execute various solutions in the second aspect.

According to a tenth aspect, an embodiment of the present disclosure provides a controller used in a storage system, and the controller includes an interface and a processor and is configured to implement various solutions in the first aspect.

According to an eleventh aspect, an embodiment of the present disclosure provides a data recovery method in a storage system, and the storage system includes a controller, a first solid state disk SSD, and a second SSD. The first SSD and the second SSD each include a plurality of namespaces, one namespace corresponds to one fault domain, the storage system includes a chunk group that is formed based on an erasure code algorithm, and the chunk group includes a first chunk and a second chunk. An address of the first chunk is a first logical address of a first namespace of the first SSD, and an address of the second chunk is a second logical address of a second namespace of the second SSD. The first logical address is mapped to a physical address provided by a first fault domain of the first SSD, and the second logical address is mapped to a physical address provided by a second fault domain of the second SSD. The method includes: receiving, by the controller, fault information of the first SSD, where the fault information is used to indicate that the first fault domain is faulty or the first namespace is faulty; and in response to the fault information, recovering, by the controller based on the erasure code algorithm, data stored at a logical address of the first chunk in the chunk group.

According to a twelfth aspect, a method for managing a solid state disk SSD is provided. The SSD includes a first fault domain and a second fault domain, and the method includes: assigning a first namespace of the SSD to the first fault domain, and assigning a second namespace of the SSD to the second fault domain.

With reference to the twelfth aspect, in some implementations of the second aspect, the method further includes: separately recording a correspondence between the first fault domain and the first namespace and a correspondence between the second fault domain and the second namespace.

With reference to the twelfth aspect, in some implementations of the second aspect, the method further includes: sending, by the SSD, the correspondence between the first fault domain and the first namespace and the correspondence between the second fault domain and the second namespace to a controller in a storage system, where the storage system includes the SSD.

With reference to the twelfth aspect, in some implementations of the second aspect, the method further includes: sending, by the SSD, a correspondence between the first fault domain and a logical address of the first namespace and a correspondence between the second fault domain and a logical address of the second namespace to a controller in a storage system, where the storage system includes the SSD.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

The technical solutions in the embodiments of this application are described in more detail below.

In the embodiments of the present disclosure, when some components of an SSD in a storage system are partially faulty, based on a manner in which a fault domain of the SSD corresponds to physical space of the SSD, a fault range is limited in the fault domain, so that an influence range on a storage system side is reduced, reconstruction overheads are reduced, and less time is consumed to reconstruct smaller storage space, thereby improving reliability.

Figure 1:
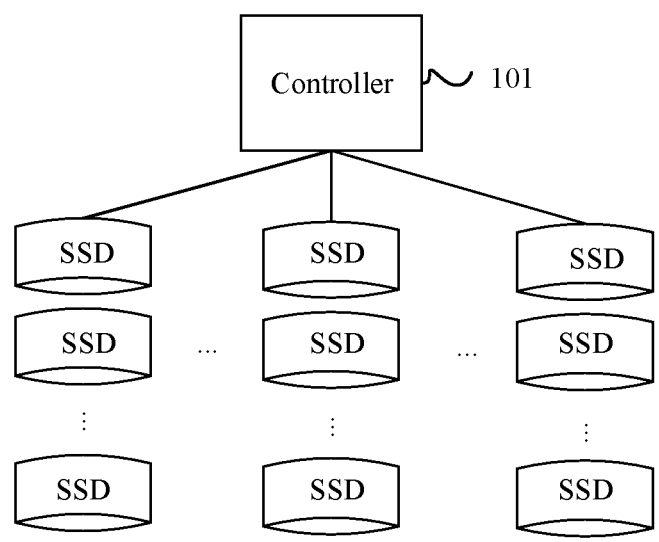
FIG. 1 is a schematic diagram of a storage system according to an embodiment of the present disclosure.
Figure 2:
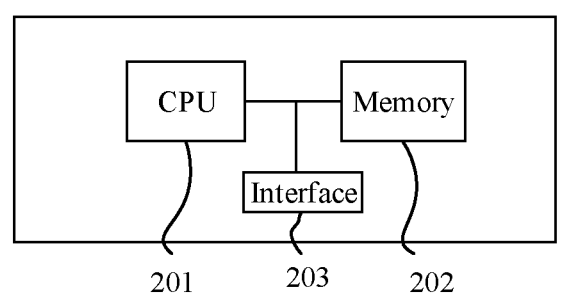
FIG. 2 is a schematic structural diagram of a storage array controller according to an embodiment of the present disclosure.

As shown in FIG. 1, a storage system in an embodiment of the present disclosure may be a storage array (such as the OceanStor® 18000 series or the OceanStor® Dorado® V3 series of Huawei®). The storage array includes a controller 101 and a plurality of SSDs. As shown in FIG. 2, the controller 101 includes a central processing unit (CPU) 201, a memory 202, and an interface 203. The memory 202 stores a computer instruction. The CPU 201 executes the computer instruction in the memory 202 to manage the storage system, perform a data access operation, a data recovery operation, and the like. In addition, to save computing resources of the CPU 201, a field programmable gate array (FPGA) or other hardware may also be used to perform all operations of the CPU 201 in this embodiment of the present disclosure, or an FPGA or other hardware and the CPU 201 are separately configured to perform some operations of the CPU 201 in this embodiment of the present disclosure. For ease of description, in this embodiment of the present disclosure, a processor is used to indicate a combination of the CPU 201 and the memory 202 and the foregoing various implementations, and the processor communicates with the interface 203. The interface 203 may be a network interface card (NIC) or a host bus adapter (HBA).

Figure 3:
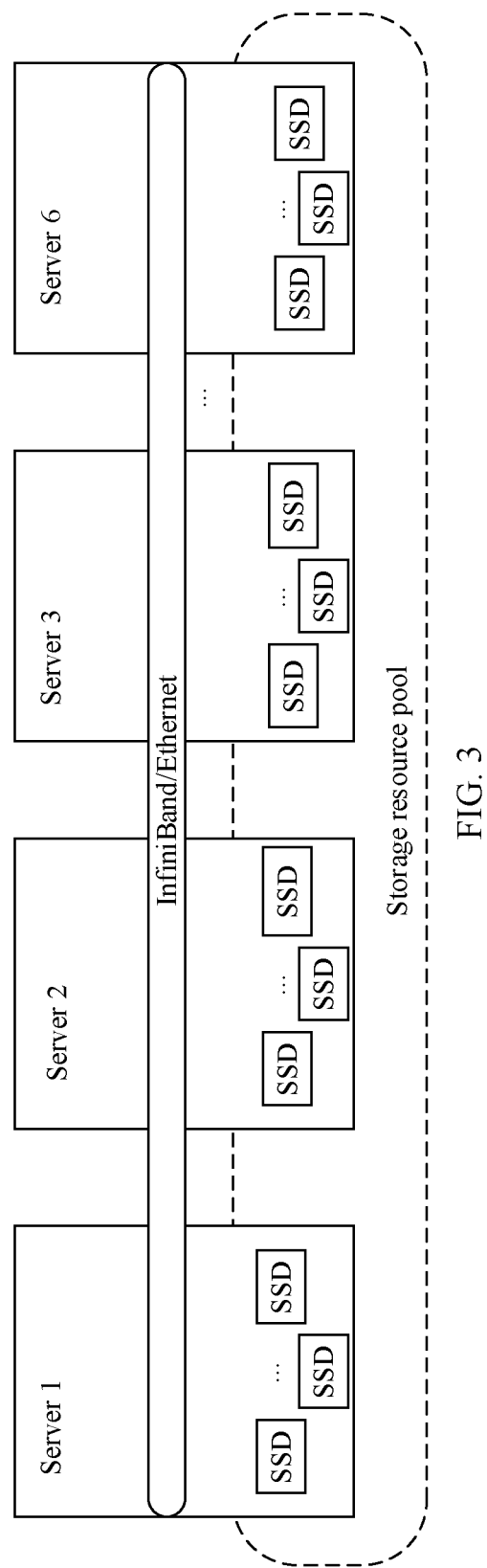
FIG. 3 is a schematic diagram of a distributed storage system according to an embodiment of the present disclosure.

Further, the storage system in this embodiment of the present disclosure may be alternatively a distributed storage system (such as the FusionStorage® series of Huawei®) or the like. The FusionStorage® series of Huawei® is used as an example. For example, as shown in FIG. 3, a distributed block storage system includes a plurality of servers, such as a server 1, a server 2, a server 3, a server 4, a server 5, and a server 6. The servers communicate with each other by using InfiniBand, an Ethernet network, or the like. In actual application, a quantity of servers in the distributed block storage system may be increased based on actual requirements. This is not limited in this embodiment of the present disclosure.

Figure 4:
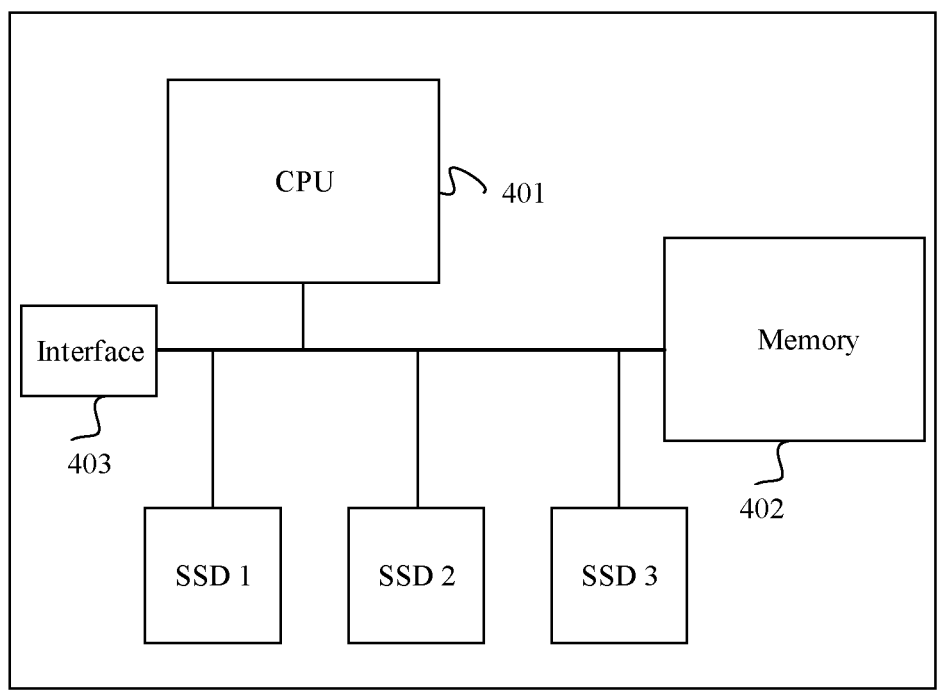
FIG. 4 is a schematic structural diagram of a server in a distributed storage system according to an embodiment of the present disclosure.

The server in the distributed block storage system includes a structure shown in FIG. 4. As shown in FIG. 4, each server in the distributed block storage system includes a central processing unit (CPU) 401, a memory 402, an interface 403, an SSD 1, an SSD 2, and an SSD 3. The memory 402 stores a computer instruction, and the CPU 401 executes the computer instruction in the memory 402 to perform a corresponding operation. The interface 403 may be a hardware interface such as a network interface card (NIC) or a host bus adapter (HBA), or may be a program interface module or the like. In addition, to save computing resources of the CPU 401, a field programmable gate array (FPGA) or other hardware may alternatively perform the foregoing corresponding operation in place of the CPU 401, or an FPGA or other hardware may perform the foregoing corresponding operation together with the CPU 401. For ease of description, in this embodiment of the present disclosure, a combination of the CPU 401 and the memory 402 and a combination of the FPGA and the other hardware in place of the CPU 401 or the FPGA and the other hardware in place of the CPU 401 and the CUP 401 are collectively referred to as a processor. The interface 403 may be a network interface card (NIC) or a host bus adapter (HBA). In the distributed storage system, a server responsible for storage management in the distributed storage system is referred to as a controller. Specifically, the controller is configured to manage storage space, access data, and the like.

Figure 5:
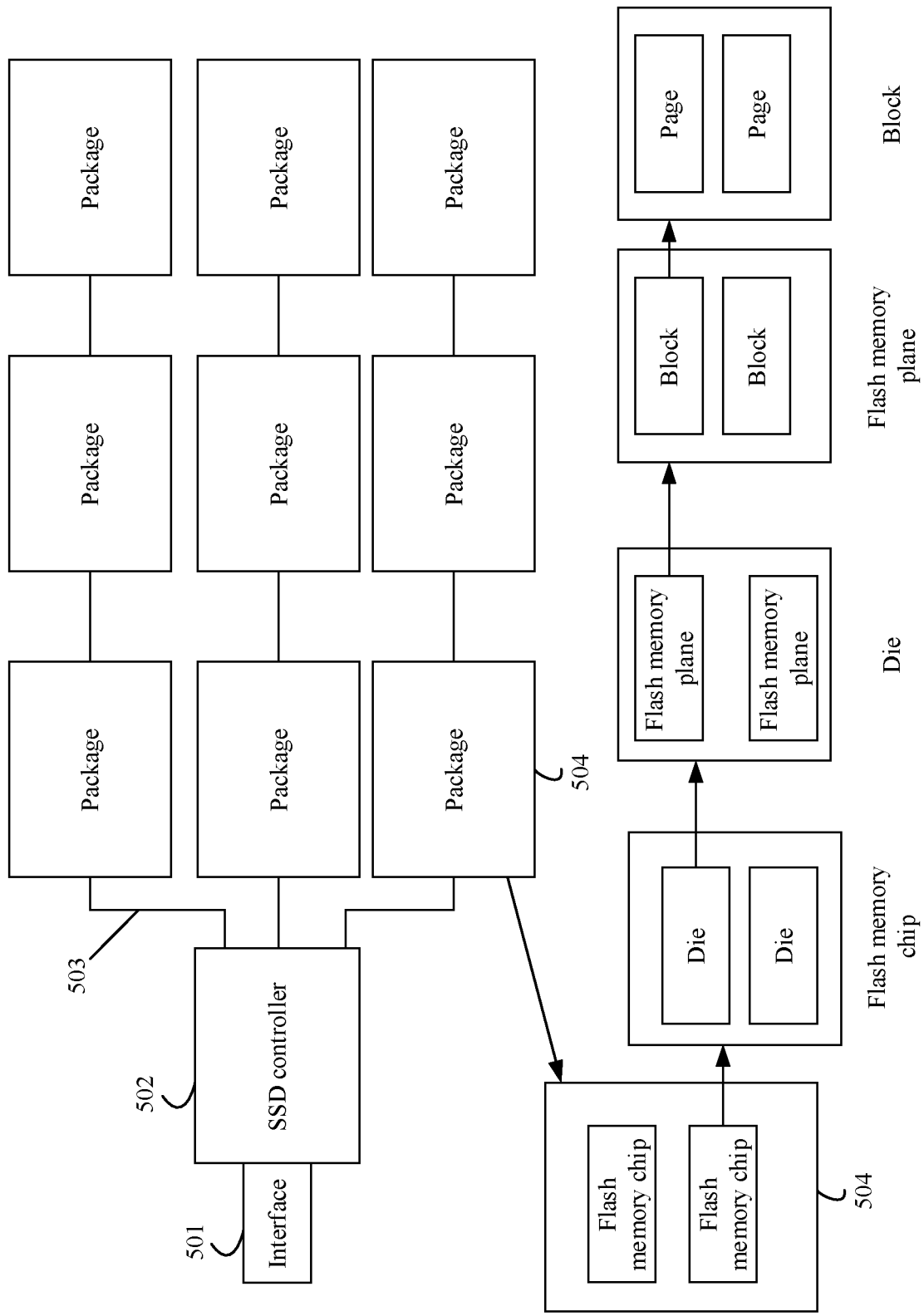
FIG. 5 is a schematic structural diagram of an SSD according to an embodiment of the present disclosure.

In the SSD, a page is used as a read/write unit and a block is used as an erase unit. The SSD can implement parallelism of data access of a plurality of levels such as a channel, a die package, a flash memory chip, a die, and a flash memory plane. In the SSD, die packages in a flash memory are organized in a multi-channel manner, a plurality of die packages may be connected on each channel, and the plurality of die packages share a transmission channel, but can independently execute instructions. For a specific structure of the SSD, refer to FIG. 5. The SSD includes an interface 501, an SSD controller 502, a channel 503, and a package 504. One package 504 includes a plurality of flash memory chips, each flash memory chip includes one or more dies, each die includes a plurality of flash memory planes, each flash memory plane includes a plurality of blocks, and each block includes a plurality of pages. The interface 501 may be an interface that supports a serial attached small computer system interface (SAS) protocol, a non-volatile memory express (NVMe) protocol, a peripheral component interconnect express (PCIe) protocol, or the like.

If the SSD is faulty, usually only some elements of the SSD are faulty, such as a physical block, but not the entire SSD is faulty. To be specific, when a fault occurs inside the SSD, a range potentially affected by the fault is not the entire SSD, but a part of the SSD. This part potentially affected by the fault is referred to as a fault domain in this embodiment of the present disclosure. Based on a structure of the SSD, the SSD is divided into a plurality of fault domains, for example, a plurality of die packages connected on a channel are used as a fault domain, or one or more dies are used as a fault domain, or one or more flash memory planes are used as a fault domain. In this embodiment of the present disclosure, if the SSD is faulty, the fault domain is considered as the range potentially affected by the fault, and data in the faulty fault domain needs to be recovered. In an actual application scenario, that the fault domain of the SSD is faulty may be that the entire fault domain is faulty, or may be that the fault domain is partially faulty. Other components of the SSD may also be used as a fault domain in the embodiments of the present disclosure. This is not limited in this embodiment of the present disclosure. The SSD monitors a status of each fault domain. In specific implementation, the controller of the SSD monitors the status of the fault domain through background inspection or the like. The SSD may further determine a health status of the fault domain based on a quantity of erasure times of a physical block in each fault domain, in other words, determine the status of the fault domain based on a wear degree.

Figures 6, 7:
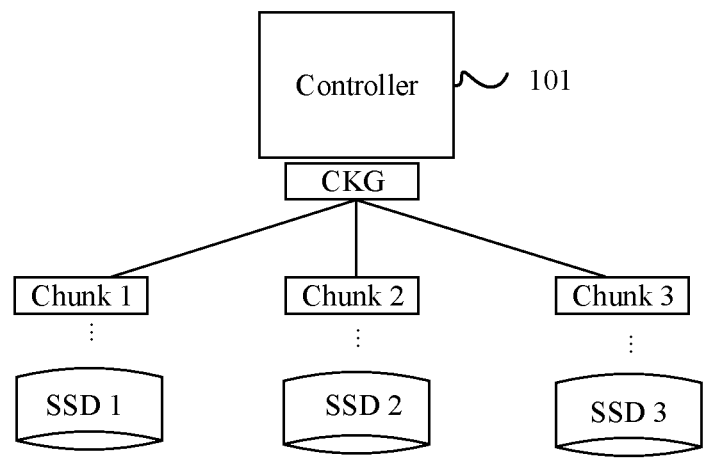
FIG. 6 is a schematic diagram of a relationship between a fault domain in an SSD and a logical address according to an embodiment of the present disclosure.
FIG. 7 is a schematic diagram of a chunk group relationship in a storage system.

The SSD externally provides storage space in a form of a logical address. In the SSD, a logical address is a logical block address (LBA), and the SSD maps the LBA to a page on a physical block of the SSD by using a flash translation layer (FTL), and establishes a mapping relationship from the LBA to a page address. In this embodiment of the present disclosure, to resolve a problem that in the storage system, if an SSD is faulty, data on the entire SSD needs to be recovered, mapping from the LBA to the page is configured in the SSD based on the fault domain. For example, one SSD includes 128 dies, and an available capacity of the SSD is 32 TB, in other words, the SSD can provide a logical address of 32 TB, or the SSD can provide address space of 32 TB. If an LBA range affected when the SSD is faulty is to be limited to a size of 1 TB, a quantity of fault domains is 32, in other words, 32 TB/1 TB=32. In this embodiment of the present disclosure, the SSD includes 128 dies, and therefore, a quantity of dies in each fault domain is 4, in other words, 128/32=4. As shown in FIG. 6, the SSD includes 32 fault domains, and fault domain identifiers are respectively 0 to 31. In specific implementation, the SSD may identify the fault domain by using a number or in another manner. This is not limited in this embodiment of the present disclosure. In one implementation, each fault domain corresponds to a specific range of LBAs of the SSD. For example, an LBA range corresponding to the fault domain 0 is 0 to (1 TB−1), an LBA range corresponding to the fault domain 1 is 1 TB to (2 TB−1), . . . , and a logical block address range corresponding to the fault domain 31 is 31 TB to (32 TB−1), in other words, logical addresses corresponding to one fault domain are contiguous. The foregoing is also referred to as assignment of a specific range of logical addresses, in other words, a specific range of LBAs, to the fault domain. In this embodiment of the present disclosure, a specific range of logical addresses are assigned to the fault domain, and this is also referred to as mapping, by the SSD, a specific range of logical addresses to a physical address in a particular fault domain based on the FTL. In this embodiment of the present disclosure, assigning a specific range of logical addresses to a fault domain does not require establishment of all mapping from the specific range of logical addresses to a physical address in the fault domain. In one implementation, when mapping from a particular logical block address in the specific range of logical addresses to a physical address needs to be established, the SSD selects the physical address from the fault domain to establish the mapping. In another implementation of this embodiment of the present disclosure, the foregoing SSD is still used as an example. LBAs in each fault domain may be non-contiguous, in other words, a specific range of logical addresses may be non-contiguous logical addresses. For example, an LBA of 32 TB is divided into 32 parts at a granularity of 1 gigabyte (GB), and each fault domain provides a physical address for an LBA of 1 TB. To be specific, an LBA range corresponding to the fault domain 0 is 0 to (1 GB−1), an LBA range corresponding to the fault domain 1 is 1 to (2 GB−1), and an LBA range corresponding to the fault domain 31 is 31 GB to (32 GB−1); then, the LBA range corresponding to the fault domain 0 is 0 to (1 GB−1), the LBA range corresponding to the fault domain 31 is 32 GB to (33 GB−1), . . . , and the LBA range corresponding to the fault domain 31 is 63 GB to (64 GB−1). A correspondence between a fault domain and an LBA range is established through circulation and interleaving. In this implementation, LBA range corresponding to one fault domain are non-contiguous. The SSD stores the foregoing mapping relationship between an LBA range and a fault domain. The SSD reports the foregoing mapping relationship between an LBA range and a fault domain to the controller 101.

In this embodiment of the present disclosure, the storage array shown in FIG. 1 is used as an example of the storage system in which the SSD provides a chunk (CK) of a fixed length, and the controller 101 forms, by using a redundancy algorithm such as an erasure code (EC) algorithm, a chunk group (CKG) by using chunks from different SSDs. In specific implementation, the EC algorithm may be a RAID algorithm. As shown in FIG. 7, the CKG includes a CK 1, a CK 2, and a CK 3. The CK 1 is provided by an SSD 1, the CK 2 is provided by an SSD 2, and the CK 3 is provided by an SSD 3. An address of the CK 1 is an LBA 1 of the SSD 1, an address of the CK 2 is an LBA 2 of the SSD 2, and an address of the CK 3 is an LBA 3 of the SSD 3. The LBA 1 is mapped to a physical address provided by a fault domain 1 of the SSD 1, and herein, the address of the CK 1 is referred to as being mapped to the physical address provided by the fault domain 1 of the SSD 1. The LBA 2 is mapped to a physical address provided by a fault domain 2 of the SSD 2. The LBA 3 is mapped to a physical address provided by a fault domain 3 of the SSD 3. In this embodiment of the present disclosure, when CKs are selected from a plurality of SSDs to form a CKG, a fault domain of an SSD that provides the CK may be determined based on load. The load may be of an input/output (IO) type, IO temperature, or the like. In one implementation, the SSD sends the correspondence between a fault domain and an LBA to the controller 101. The controller 101 may determine, based on a correspondence between a fault domain of the SSD and a logical address, a fault domain corresponding to a logical address of each CK in the CKG. The controller 101 obtains status information of the SSD. For example, when the fault domain 1 of the SSD 1 is faulty, the SSD 1 sends fault information to the controller 101, to indicate that the fault domain 1 is faulty. Because the controller 101 can determine, based on the correspondence between a fault domain of an SSD and a logical address, an LBA affected when the fault domain 1 of the SSD 1 is faulty, and the storage array includes a plurality of CKGs, the controller 101 learns, through searching, that an address of a CK included in the CKG is an LBA mapped to the fault domain 1 of the SSD 1. For example, it is determined that an address of a CK 1 included in a CKG 1 is the LBA mapped to the fault domain 1 of the SSD 1. The controller 101 recovers data of the CK 1 in the CKG 1 based on a redundancy algorithm such as the EC algorithm. Therefore, compared with the prior art, in this embodiment of the present disclosure, it is unnecessary to reconstruct CKs corresponding to all logical addresses provided by the SSD 1, thereby increasing a data reconstruction speed. In a specific implementation process, the data in the CK 1 may be recovered to another fault domain of the SSD 1 or another SSD. This is not limited in this embodiment of the present disclosure.

Figure 8:
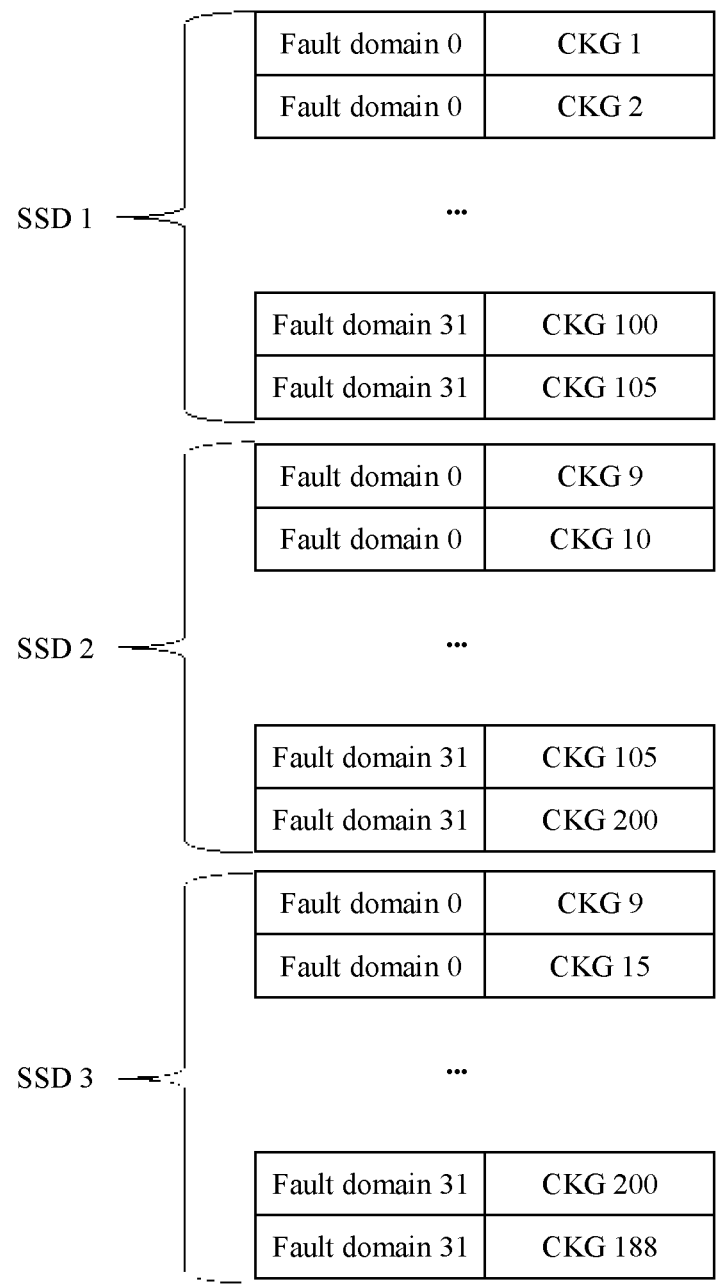
FIG. 8 is a schematic diagram of a fault domain index table.

Further, the SSD reports the mapping relationship between an LBA and a fault domain to the controller 101. Therefore, the storage array stores a correspondence between an address of a CK included in a CKG and a fault domain. For example, a first CK belongs to a first fault domain, and a second CK belongs to a second fault domain. Further, to quickly learn, through searching, the address of the CK included in the CKG is the LBA mapped to the fault domain of the SSD 1, the storage array further stores a fault domain index table based on the mapping relationship between an LBA and a fault domain. For example, the fault domain index table includes a correspondence between a fault domain and a CKG, for example, a correspondence between a fault domain identifier and a CKG identifier. Because a same CKG includes CKs from fault domains of different SSDs, in the fault domain index table, different fault domains may correspond to a same CKG. When a fault domain of an SSD is faulty, the controller 101 can quickly find, based on the fault domain index table, a CKG affected by the fault domain, to quickly reconstruct data in a CK that is in the CKG and that is affected by the fault domain. In specific implementation, when creating the CKG, the controller 101 may record a corresponding entry in the fault domain index table based on the mapping relationship between an LBA and a fault domain, and the entry includes the correspondence between a fault domain and a CKG. To facilitate query and management of the fault domain index table, in one implementation, a multi-level fault domain index table may be created, for example, a first level is an SSD and fault domain index table, and a second level is a fault domain and CKG index table. In another implementation, as shown in FIG. 8, the fault domain index table may be partitioned based on the SSD, thereby facilitating quick query.

In this embodiment of the present disclosure, in another implementation, in an SSD supporting the NVME interface specification, a corresponding namespace may be allocated to the SSD based on a quantity of fault domains, to be specific, one fault domain corresponds to one namespace. Therefore, logical addresses of different namespaces of an SSD can be independently addressed. For example, that the available capacity of the SSD is 32 TB is still used as an example. The SSD is divided into 32 fault domains and one namespace is allocated to one fault domain. An LBA range of each namespace is 0 to (1 TB−1). An LBA of one namespace is mapped to a physical address in a fault domain corresponding to the namespace. The SSD reports a mapping relationship between a namespace and a fault domain to the controller 101. The SSD stores the mapping relationship between a namespace and a fault domain. The SSD reports the mapping relationship between a namespace and a fault domain to the controller 101. In another implementation, a mapping relationship between an LBA in a namespace and a fault domain may be reported. In this embodiment of the present disclosure, when CKs are selected from a plurality of SSDs to form a CKG, a namespace of an SSD that provides the CK may be determined based on load. The load may be of an input/output (IO) type, IO temperature, or the like.

Figure 9:
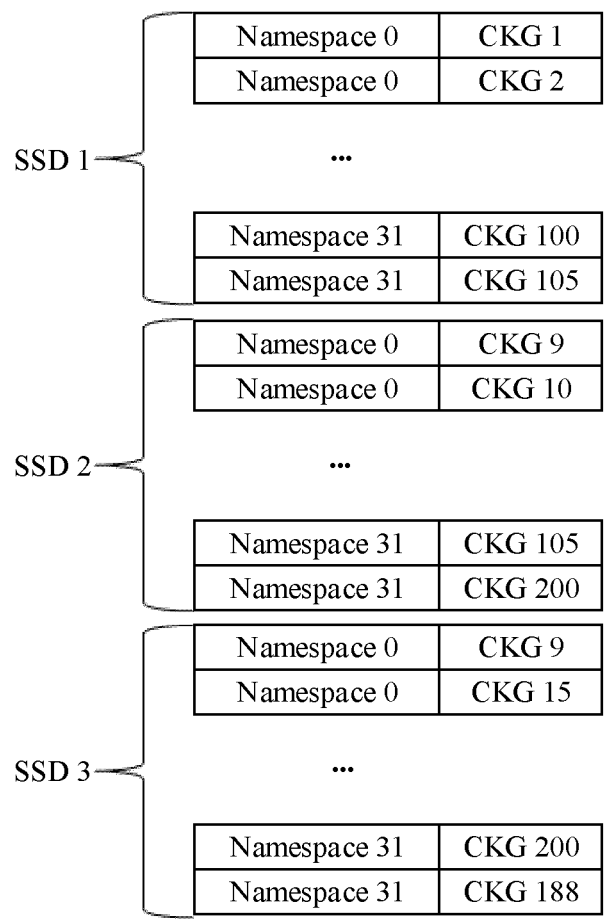
FIG. 9 is a schematic diagram of a namespace index table.

Accordingly, as described above, the storage array stores a fault domain index table. In another implementation, the storage array stores a namespace index table, and the namespace index table includes a correspondence between a namespace and a CKG, for example, a correspondence between a namespace identifier and a CKG identifier. Because a same CKG includes CKs from namespaces of different SSDs, in the namespace index table, different namespaces may correspond to a same CKG. When a fault domain of an SSD is faulty, the SSD reports fault information to the controller 101, and the fault information is used to indicate a namespace in which a fault occurs. For example, the fault information includes a namespace identifier. The controller 101 can quickly find, based on the namespace index table, a CKG affected by the fault domain, to quickly reconstruct data in a CK that is in the CKG and that is affected by the fault domain. In specific implementation, when allocating and creating the CKG, the controller 101 may record a corresponding entry in the namespace index table based on the mapping relationship between a namespace and a fault domain, and the entry includes the correspondence between a namespace and a CKG. To facilitate query and management of the namespace index table, in one implementation, a multi-level namespace index table may be created, for example, a first level is an SSD and namespace index table, and a second level is a namespace and CKG index table. In another implementation, as shown in FIG. 9, the namespace index table may be partitioned based on the SSD, thereby facilitating quick query.

In this embodiment of the present disclosure, when the SSD collects junk data, valid data is also written in different physical addresses of a same fault domain.

In this embodiment of the present disclosure, the controller of the SSD collects wear information of each fault domain inside the SSD, and reports the wear information of the fault domain to the controller 101. When creating the CKG, the controller 101 selects, based on a wear degree of each fault domain of the SSD and a data modification frequency, a CK that is mapped to a physical address of a corresponding fault domain.

This embodiment of the present disclosure may also be applied to an SSD that supports an open channel. In the SSD that supports the open channel, in one implementation, the SSD is divided into a plurality of fault domains, and the controller 101 in the storage system can directly access a physical address of the SSD. When the SSD establishes a mapping relationship between a fault domain and a physical address of the SSD, an address of a CK that constitutes the CKG in the storage system may be the physical address of the SSD, in other words, the address of the CK is a physical address provided by the fault domain of the SSD, and the address of the CK is mapped to the physical address provided by the fault domain of the SSD. In this embodiment of the present disclosure, for another operation required for implementation that is based on the SSD supporting the open channel, refer to descriptions of other embodiments of the present disclosure. Details are not described herein.

Various operations performed by the SSD in this embodiment of the present disclosure may be performed by the controller of the SSD.

Figure 10:
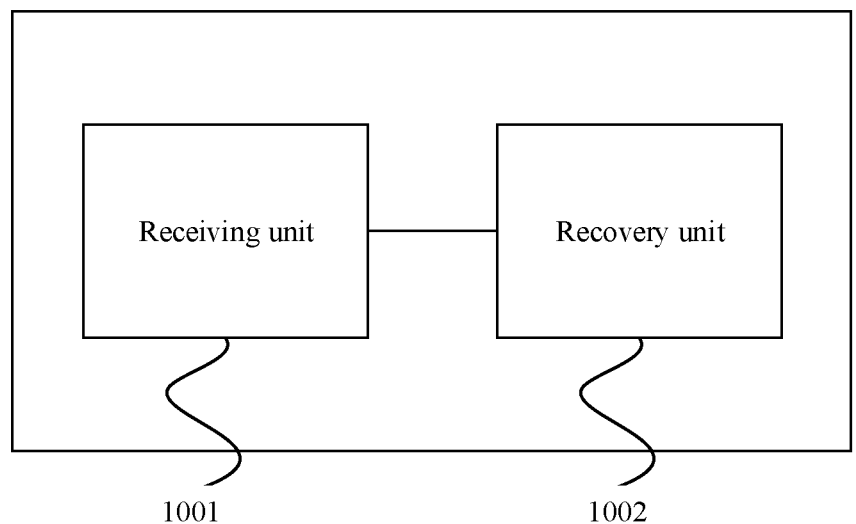
FIG. 10 is a schematic structural diagram of a controller.

Accordingly, an embodiment of the present disclosure also provides a controller applied to a storage system. The storage system includes the controller, a first solid state disk SSD, and a second SSD. The first SSD and the second SSD each include a plurality of fault domains, the storage system includes a chunk group that is formed based on an erasure code algorithm, and the chunk group includes a first chunk and a second chunk. An address of the first chunk is mapped to a physical address provided by a first fault domain of the first SSD, and an address of the second chunk is mapped to a physical address provided by a second fault domain of the second SSD. As shown in FIG. 10, the controller includes a receiving unit 1001 and a recovery unit 1002. The receiving unit 1001 is configured to receive fault information of the first SSD, where the fault information is used to indicate that the first fault domain is faulty. The recovery unit 1002 is configured to: in response to the fault information, recover, based on the erasure code algorithm, data stored at the address of the first chunk in the chunk group. Further, the storage system stores a correspondence between the address of the first chunk and the first fault domain and a correspondence between the address of the second chunk and the second fault domain, and the controller further includes a query unit, configured to query a correspondence between the first fault domain and the chunk group to determine the chunk group. For specific implementation of the controller shown in FIG. 10, refer to the previous implementations of the embodiments of the present disclosure, for example, a structure of the controller 101 shown in FIG. 2. Details are not described herein again. In another implementation, the controller provided in FIG. 10 of the embodiments of the present disclosure may be implemented by software.

Figure 11:
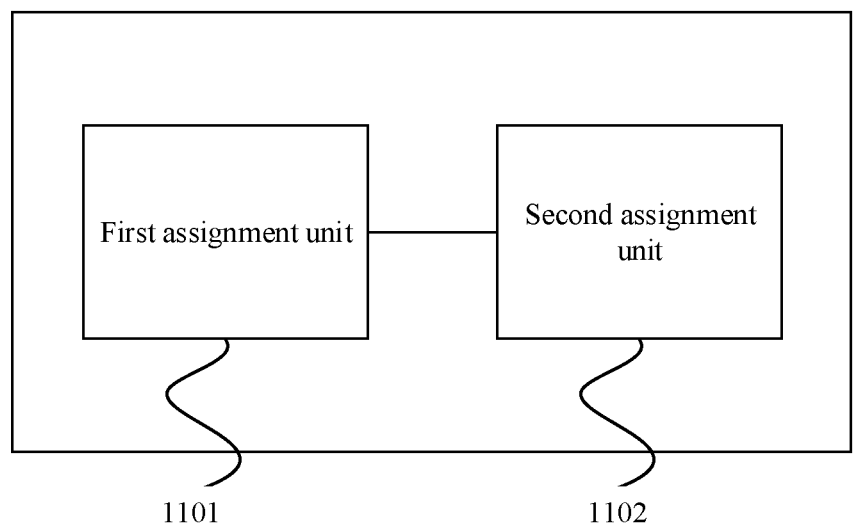
FIG. 11 is a schematic structural diagram of an apparatus for managing an SSD.

As shown in FIG. 11, an embodiment of the present disclosure further provides an apparatus for managing an SSD, where the SSD includes a first fault domain and a second fault domain. The apparatus for managing the SSD includes: a first assignment unit 1101, configured to assign a first range of logical addresses of the SSD to the first fault domain; and a second assignment unit 1102, configured to assign a second range of logical addresses of the SSD to the second fault domain. Further, the apparatus for managing the SSD further includes a sending unit, configured to send a correspondence between the first fault domain and the first range of logical addresses and a correspondence between the second fault domain and the second range of logical addresses to a controller in a storage system, where the storage system includes the SSD. Further, the apparatus for managing the SSD further includes a recording unit, configured to separately record the correspondence between the first fault domain and the first range of logical addresses and the correspondence between the second fault domain and the second range of logical addresses. For a hardware implementation of the apparatus for managing the SSD provided in this embodiment of the present disclosure, refer to a structure of the controller of the SSD. Details are not described herein in this embodiment of the present disclosure. In another implementation, the apparatus for managing the SSD provided in this embodiment of the present disclosure may be implemented by software, or may be jointly implemented by a controller of the SSD and software.

An embodiment of the present disclosure provides a computer readable storage medium, and the computer readable storage medium stores a computer instruction. When the computer instruction runs on the controller 101 shown in FIG. 1 or the server shown in FIG. 4, the method in the embodiments of the present disclosure is performed.

An embodiment of the present disclosure provides a computer program product including a computer instruction. When the computer instruction runs on the controller 101 shown in FIG. 1 or the server shown in FIG. 4, the method in the embodiments of the present disclosure is performed.

Each unit of a data recovery apparatus provided in the embodiment of the present disclosure may be implemented by a processor, or may be jointly implemented by a processor and a memory, or may be implemented by software.

An embodiment of the present disclosure provides a computer program product including a computer instruction. When the computer instruction runs on a controller of an SSD, the method for managing the SSD in the embodiments of the present disclosure is performed.

The logical address in the embodiments of the present disclosure may be alternatively a key value (KV) in a KV disk, a log in a log disk, or the like.

In the embodiments of the present disclosure, the correspondence has a same meaning as the mapping relationship. The expression of a correspondence between an address of a chunk and a fault domain has a same meaning as a correspondence between a fault domain and an address of a chunk.

It should be noted that the memory described in this specification is intended to include, but is not limited to, these and any other suitable types of memory.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in the form of a software product. The computer software product is stored in a storage medium and includes several computer instructions for instructing a computer device (which may be a personal computer, a server, a network device, or the like) to perform all or some of the steps of the methods described in the embodiments of the present disclosure. The storage medium includes various media that can store computer instructions, such as, a USB flash drive, a removable hard disk, a read-only memory (ROM), a random access memory (RAM), a magnetic disk, or an optical disk.

The invention claimed is:

1. A configuration method for Solid State Disks (SSDs), comprising:
    dividing a storage medium of a first SSD and a second SSD into a plurality of fault domains wherein at least one fault domain is non-contiguous, the first SSD and the second SSD each comprising a plurality of the fault domains, the storage system comprising a chunk group formed based on an erasure code algorithm, and the chunk group comprising a first chunk and a second chunk, an address of the first chunk mapped to a physical address provided by a first fault domain of the first SSD, an address of the second chunk mapped to a physical address provided by a second fault domain of the second SSD, and at least one chunk group mapped to multiple fault domains;

associating a namespace with each fault domain;

receiving fault information of the first SSD, wherein the fault information indicates that the first fault domain is faulty; and in response to the fault information, recovering, based on the erasure code algorithm, data stored at the address of the first chunk in the chunk group;

wherein each fault domain has its own performance characteristic; and wherein each fault domain comprises at least one of a channel, a die package, a flash memory chip, a die, and a flash memory plane.

2. The method of claim 1, wherein the method further comprises:

reporting a logic address in the namespace to a host.

3. The method of claim 1, wherein the SSD supports an open channel.

4. The method of claim 1, wherein the SSD has terabyte level capacity.

5. A system comprising a first Solid State Disk (SSD) and a second SSD, comprising:

a storage medium; and an SSD controller coupled to the storage medium and configured to:

divide a storage medium of the first SSD and the second SSD into a plurality of fault domains wherein at least one fault domain is non-contiguous, the first SSD and the second SSD each comprising a plurality of the fault domains, the storage system comprising a chunk group formed based on an erasure code algorithm, and the chunk group comprising a first chunk and a second chunk, an address of the first chunk mapped to a physical address provided by a first fault domain of the first SSD, an address of the second chunk mapped to a physical address provided by a second fault domain of the second SSD, and at least one chunk group mapped to multiple fault domains;

associate a namespace with each fault domain;

receiving fault information of the first SSD, wherein the fault information indicates that the first fault domain is faulty; and in response to the fault information, recovering, based on the erasure code algorithm, data stored at the address of the first chunk in the chunk group;

wherein each fault domain has its own performance characteristic; and wherein each fault domain comprises at least one of a channel, a die package, a flash memory chip, a die, and a flash memory plane.

6. The SSD of claim 5, wherein the SSD controller is further configured to:

report a logic address in the name space to a host.

7. The SSD of claim 5, wherein the SSD supports an open channel.

8. The SSD of claim 5, wherein the SSD has terabyte-level capacity.

9. A non-transitory computer storage medium, comprising computer instructions configured to cause a processor to perform the following method:

dividing a storage medium of a first solid state drive (SSD) and a second SSD into a plurality of fault domains wherein at least one fault domain is non-contiguous, the first SSD and the second SSD each comprising a plurality of the fault domains, the storage system comprising a chunk group formed based on an erasure code algorithm, and the chunk group comprising a first chunk and a second chunk, an address of the first chunk mapped to a physical address provided by a first fault domain of the first SSD, an address of the second chunk mapped to a physical address provided by a second fault domain of the second SSD, and at least one chunk group mapped to multiple fault domains;

associating a namespace for each fault domain;

receiving fault information of the first SSD, wherein the fault information indicates that the first fault domain is faulty; and in response to the fault information, recovering, based on the erasure code algorithm, data stored at the address of the first chunk in the chunk group;

wherein each fault domain has its own performance characteristic; and wherein each fault domain comprises at least one of a channel, a die package, a flash memory chip, a die, and a flash memory plane.

10. The computer storage medium of claim 9, wherein the computer instructions are further configured to cause the processor to perform:

reporting a logic address in the name space to a host.

11. The computer storage medium of claim 9, wherein the SSD is an open channel enabled SSD.

12. The computer storage medium of claim 9, wherein the SSD is an SSD of terabyte-level capacity.

* * * * *